United States Patent
Rohrberg et al.

(10) Patent No.: US 10,641,352 B2
(45) Date of Patent: May 5, 2020

(54) METHOD FOR APPLYING SAND TO DRUM BRAKE LININGS

(71) Applicant: TMD Friction Services GmbH, Leverkusen (DE)

(72) Inventors: Bernd Rohrberg, Essen (DE); Werner Rothmann, Essen (DE); Dieter Wappler, Odenthal (DE); Dominik Maus, Leverkusen (DE)

(73) Assignee: TMD Friction Services GmbH, Leverkusen (DE)

( * ) Notice: Subject to any disclaimer, the term of this patent is extended or adjusted under 35 U.S.C. 154(b) by 330 days.

(21) Appl. No.: 15/525,964

(22) PCT Filed: May 24, 2016

(86) PCT No.: PCT/EP2016/061645
§ 371 (c)(1),
(2) Date: May 11, 2017

(87) PCT Pub. No.: WO2016/193056
PCT Pub. Date: Dec. 8, 2016

(65) Prior Publication Data
US 2017/0314629 A1    Nov. 2, 2017

(30) Foreign Application Priority Data
Jun. 3, 2015   (DE) ........................ 10 2015 108 770

(51) Int. Cl.
*F16D 69/04*   (2006.01)
*F16D 65/08*   (2006.01)
*F16D 69/02*   (2006.01)
*B05D 1/28*   (2006.01)
*B05D 3/06*   (2006.01)

(52) U.S. Cl.
CPC ........... *F16D 69/0416* (2013.01); *B05D 1/28* (2013.01); *B05D 3/067* (2013.01); *F16D 65/08* (2013.01); *F16D 69/02* (2013.01); *F16D 2069/0466* (2013.01); *F16D 2069/0475* (2013.01); *F16D 2069/0491* (2013.01); *F16D 2200/0065* (2013.01); *F16D 2200/0069* (2013.01); *F16D 2250/0046* (2013.01); *F16D 2250/0069* (2013.01); *F16D 2250/0092* (2013.01)

(58) Field of Classification Search
None
See application file for complete search history.

(56) References Cited

U.S. PATENT DOCUMENTS

| | | | |
|---|---|---|---|
| 1,890,735 A | | 12/1932 | Lake |
| 3,899,050 A | * | 8/1975 | Savary ................ F16D 65/0037 188/251 A |
| 4,694,937 A | | 9/1987 | Jonas |
| 5,083,650 A | | 1/1992 | Eldridge |
| 8,025,134 B2 | | 9/2011 | Foge |
| 2007/0056816 A1 | | 3/2007 | Giangrande |
| 2007/0082964 A1 | * | 4/2007 | Weine Ramsey ........ B05D 7/14 522/7 |
| 2008/0308365 A1 | | 12/2008 | Foge |

FOREIGN PATENT DOCUMENTS

| | | |
|---|---|---|
| AT | 504820 | 8/2008 |
| AT | 504820 B1 | 10/2012 |
| DE | 3508109 | 9/1986 |
| DE | 10002261 | 7/2000 |
| DE | 10316369 | 7/2004 |
| EP | 0836030 | 4/1998 |
| EP | 1022481 A1 | 7/2000 |
| FR | 1255831 | 3/1961 |
| GB | 1457419 | 12/1973 |

OTHER PUBLICATIONS

Handbook of Plastics Joining a Practical Guide, 2d ed., Michael J. Troughton, ed., William Andrew, Inc. (2008).

* cited by examiner

*Primary Examiner* — Shamim Ahmed
*Assistant Examiner* — Bradford M Gates
(74) *Attorney, Agent, or Firm* — Rogowski Law LLC

(57) ABSTRACT

The invention relates to a method for applying sand to the inner radius of drum brake linings comprising the following steps: a) rolling a UV-curing adhesive onto the inner radius of a drum brake lining, b) applying a frictional grain, such as zircon sand, to the adhesive layer, c) removing the frictional grain not retained by the adhesive from the lining surface, and d) curing the coating by means of UV radiation.

16 Claims, No Drawings

METHOD FOR APPLYING SAND TO DRUM BRAKE LININGS

CROSS-REFERENCE TO RELATED APPLICATIONS

This application is a national stage application (under 35 USC § 371) of PCT/EP2016/061645, filed May 24, 2016, which claims benefit of German application Na. 10 2015 108 770.7, filed Jun. 3, 2015, the contents of each of which are incorporated by reference herein.

BACKGROUND OF THE INVENTION

Technical Field and State of the Art

The present invention relates to a method for applying sand to drum brake linings, especially to an environmentally safe and cost-effective method for their production.

A drum brake fundamentally comprises a brake shoe or, to put it more precisely, a left brake shoe and a right brake shoe, to which the actual friction lining, hereinafter referred to as the drum brake lining, is attached. The friction lining can be attached by means of various methods or employing various means, whereby the most common method consists of riveting the friction lining onto the brake shoe or brake shoes.

It has been found that, owing to the high mechanical stress that acts on the brake lining during the operation of the brakes, the adhesion or the adhesion coefficient between the brake shoe and the actual friction lining is not always sufficient and, under certain circumstances, this can cause the friction lining to shear off of the brake shoe at high braking torques. Appertaining solutions to this problem have been described in the state of the art since this constitutes a potential safety risk and, at the same time, entails a shortening of the service life of a drum brake and thus an increase, in the ongoing operating costs.

Such a solution involves applying sand to the inner surface of the drum brake lining, that is to say, to the surface via which the friction lining is joined to the brake shoe, for example, by means of riveting. The term "applying sand" means that the inner surface or the inner radius (facing, the brake shoe) is additionally coated with abrasive particles. The purpose of this coating is to increase the adhesion coefficient between the friction lining and the brake shoe, thereby preventing the friction lining from shearing off of the brake shoe at high braking torques.

In order to ensure the adhesion of the abrasive particles (for example, aluminum oxide/corundum, silicon dioxide) to the friction lining surface, the methods known from the state of the art call for the surface that is to be coated to be sprayed with an adhesive having a high content of solvent. Due to the content of organic solvent, the method is very detrimental to the environment. For instance, the exhaust air containing solvent coming from the spray booth as well as from the later drying of the adhesive coating has to be disposed of with a great deal of effort and, in certain cases, this entails a high expenditure of energy for the requisite post-incineration. Additional disposal resources are needed for the residues that are formed and deposited in the installation. These residues are formed, not least of all due to the so-called overspray that is unavoidable with the prior-art methods and that also leads to a higher and thus more costly consumption of material.

Fundamentally, coating methods for brake linings are known which involve coating the lining, surface on the friction side and in which organic solvents are largely replaced by water, although these do not solve the above-mentioned problem caused by overspray, that is to say, coating material that is not deposited on surface of the lining (European patent specification EP 1 022 481 B1).

U.S. Pat. No. 5,083,650 describes the production of an abrasive material, whereby a heat-resistant paper serves as a substrate for the actual friction lining which is preferably made of resin cross-linked aramid fibers. Several layers of binders and abrasive particles are applied onto this substrate and are then cured by a heat treatment.

German patent application DE 35 08 109 A1 discloses a friction lining for drum brakes in which the surface of the friction lining that is in contact with the lining carrier is provided with particles that are harder than the material of the opposite surface of the lining carrier. The particles are applied in the form of a dispersion consisting of binders and particles and they are pressed into both surfaces under the application of pressing forces.

European patent application EP 0 836 030 A1 relates to a method for the production of a brake lining for disc brakes in which turning chips are incorporated into a separate adhesive coating on the carrier plate. The abrasive material is pressed on after the curing.

German patent application DE 103 16 369 A1 describes a carrier plate for a friction lining onto which a structured surface is applied as the anchoring bed for the friction lining. The anchoring bed consists of a cured preparation whose components are solutions of alkali silicate or earth-alkali silicate and/or suspensions of aluminum oxide, zirconium oxide or magnesium oxide.

German patent application DE 100 02 261 A1 discloses a brake lining with a friction lining whose surface is coated in order to prevent a drop in the adhesion coefficient. The surface coating is optically curable and consists of a substrate on the basis of acrylate.

British patent document GB 1 457 419 likewise describes a brake lining in which the actual friction lining is coated on the friction surface with a composition made up of binders and abrasive particles.

The subject matter of Austrian patent specification AT 504 820 B1 is a brake shoe whose functional surface is provided at least partially with a friction lining comprising a binder matrix consisting of synthetic resin and abrasive particles. At least some of the abrasive particles have a diameter that is greater than the coating thickness of the binder matrix.

SUMMARY OF THE INVENTION

Before this backdrop, one objective of the present invention is to put forward a method for applying sand to drum brake linings in order to increase the adhesion coefficient between the inner surface of the friction lining and the brake shoe that is joined to this surface, whereby the method entails very few or none of the drawbacks of the state of the art.

This objective is achieved, according to the invention by a method for applying sand to the surface of a friction lining, preferably a friction lining for a drum brake, and further preferred for applying sand to the inner surface or to the inner radius of a friction lining for a drum brake (drum brake lining), said method comprising the following steps:

a) an adhesive is applied onto the inner surface (inner radius) of a friction lining for a drum brake, b) the abrasive particles are applied onto the surface coated with the adhesive, c) the abrasive particles that have not been held by the adhesive are removed from the lining surface, and
d) the coating is cured by means of light, especially UV light.

DETAILED DESCRIPTION

The adhesive is applied by means of a process in which adhesive is only applied to the surface to be treated so that there is no material loss of the type encountered with overspray. According to the invention, preference is given to applying the adhesive using a roller, especially a foam roller, whose length (width of the roller) matches the width of the friction lining.

Since the lining of a drum brake is curved and therefore has an inner radius, it is also preferred according to the invention if the roller is guided automatically, for instance, by means of a robot, or else semi-automatically using a suitable mechanical means.

The applied amount of adhesive preferably ranges from 0.008 g/cm$^2$ to 0.024 g/cm$^2$ of coated surface.

Preferably, photo-initiated curing adhesives such as UV-curing and light-curing adhesives are employed as the adhesives. In this context, especially benzophenone and its derivatives serve as photo-initiators. Special preference is given to UV-curing adhesives on the basis of acrylate.

Adhesives that are suitable according to the invention are also employed to paint and/or to coat the friction side of disc brake linings used in trucks. Here, the coating or paint serves to ensure a sufficient braking action when the brake system has not been broken in yet; such adhesives are described, for example, in European patent specification EP 1 022 481 B1.

The preferred UV-curing adhesives, especially acrylate systems, have only one single component, are free of solvents and are cold-curing. Generally speaking, the system functions in that the liquid adhesive is filled, among other things, with photo-initiators that are activated by UV light and that form radicals which, in turn, initiate the curing process. Acrylates and epoxies constitute the basis of most UV adhesives. These adhesives are characterized by their very short curing times and volume constancy during the curing process.

Moreover, no harmful reaction products, especially no harmful gases, are generated during the curing process. The linings coated with adhesive onto which abrasive particles (sand) have been scattered are transported on a conveyor belt at a uniform speed and preferably at ambient temperature through a so-called UV tunnel under a UV lamp. The length of the tunnel, the conveying speed and the distance of the treated linings, which altogether correspond to the duration of the irradiation, are selected in such a way that a complete curing of the adhesive is achieved. The typical range for the energy absorption of such coatings is from 0.2 J/cm$^2$ to 4 J/cm$^2$, preferably within the range from 0.5 J/cm$^2$ to 1 J/cm$^2$. The typical exposure time with appropriate UV light is from 3 to 40 seconds. The time is dependent on the applied amount or on the layer thickness of the UV paint.

The preferred wavelength range for the UV radiation, depending on the adhesive used, is from 180 nm to 500 nm, especially 250 nm to 400 nm. Especially preferably, the wavelength is approximately 395 nm; this holds true particularly for UV acrylate adhesive. Consequently, this wavelength is in the range of the boundary between UVA and visible light. On the one hand, this means that transparent and yet UV light-absorbing adhesives can be effectively transluminated or cured. On the other hand, the storage stability of such adhesives does not pose any special problems.

The abrasive particles are applied onto the inner surface or inner radius of the friction lining coated with adhesive by scattering abrasive particles onto the surface. An important aspect is to distribute the particles as uniformly as possible onto the lining surface. This is preferably accomplished using an automatic or semi-automatic device with a container that is filled with abrasive particles and that has a linear outlet, whereby the lining is passed under the outlet at a speed that is as uniform as possible. Subsequently, the excess abrasive particles, which can also be referred to as sand, are removed. This is preferably done by simply tilting the friction lining, as a result of which the abrasive particles that have not been bonded by the adhesive fall off of the lining surface.

As an alternative, the excess sand can also be removed by being vacuumed up or blown off. This results in the desired coating thickness of sand, which is generally within the range from 0.02 g/cm$^2$ to 0.15 g/cm$^2$, preferably within the range from 0.04 g/cm$^2$ to 0.09 g/cm$^2$. The abrasive particles that have fallen off of the lining surface are collected in a container, which is a simple way to avoid material losses.

According to the invention, zirconium sand, which consists primarily of the mineral zirconium silicate ($ZrSiO_4$), is employed as the abrasive particle or sand to be applied onto the surface. In general, preference is also given to synthetic zirconium silicates (ceramic pigments), metal oxides (for instance, zinc oxide and titanium dioxide), silicon dioxide (quartz) or aluminum oxide such, as, for example, corundum. The abrasive particles or sand can consist of one or more of the cited substances which, as a rule, can be combined as desired. The grain size of the abrasive particles is preferably within the range from 0.03 mm to 0.25 mm.

The features described in the individual method steps can be combined as desired.

Drum brake linings onto which sand has been applied to the inner radius or inner surface by means of the method according to the invention stand out for an environmentally friendly mode of production that saves on material. Drum brakes that have the drum brake linings or friction linings according to the invention are characterized by high mechanical stability. Even at high braking torques, the inventive application of sand to the inner surface of the friction lining reliably prevents the brake lining from shearing off of the brake shoe. For this reason, such drum brake linings are also particularly well-suited for the initial installation of drum brakes in trucks.

Additional objectives, advantages, features and application possibilities of the present invention can be gleaned from the description herein. In this context, all of the described and/or depicted features, either on their own or in any meaningful combination, constitute the subject matter of the present invention, also irrespective of their compilation in the claims or in the claims to which they refer back.

The invention claimed is:
1. A method for applying sand to the inner radius of drum brake linings, said method comprising the following steps:
 a) applying an adhesive onto the inner radius of a friction lining for a drum brake using a roller,
 b) applying abrasive particles onto the inner radius of the drum brake lining coated with the adhesive,
 c) removing the abrasive particles that have not been held by the adhesive from the surface of the drum brake lining, d) curing a coating consisting essentially of the adhesive and the abrasive particles; and
e) joining the friction lining to a brake shoe of a drum brake with the cured coating in direct contact with the brake shoe;

wherein the cured coating increases adhesion between the friction lining and the brake shoe of the drum brake.

2. The method according to claim 1, wherein the adhesive is a photo-initiated curing adhesive.

3. The method according to claim 1, wherein the adhesive is an acrylate based UV-curing adhesive.

4. The method according to claim 1, wherein the adhesive is applied onto the inner radius in an amount ranging from 0.008 g/cm$^2$ to 0.024 g/cm$^2$.

5. The method according to claim 1, wherein the abrasive particles are selected from the group consisting of zirconium sand, zirconium silicates, metal oxides, quartz or corundum and mixtures thereof.

6. The method according to claim 5, wherein the abrasive particles are zirconium sand.

7. The method according to claim 1, wherein the abrasive particles have a grain size within the range from about 0.03 mm to about 0.25 mm.

8. The method according to claim 1, wherein curing is by applying UV radiation in the wavelength range from about 180 nm to about 500 nm.

9. The method according to claim 1, wherein curing is by applying UV radiation in the wavelength range from about 250 nm to about 400 nm.

10. The method according to claim 1, wherein the applying step a) is carried out without overspraying adhesive onto surfaces beyond the inner radius of the drum brake lining.

11. A method for applying sand to the inner radius of drum brake linings, said method comprising the following steps:
a) rolling an adhesive onto the inner radius of a friction lining for a drum brake,
b) distributing abrasive particles onto the inner radius of the drum brake lining coated with the adhesive,
c) curing a coating consisting essentially of the adhesive and the abrasive particles; and
d) joining the friction lining to a brake show of a drum brake with the cured coating in direct contact with the brake shoe, wherein the cured coating increases adhesion between the friction lining and the brake shoe of the drum brake.

12. The method according to claim 11, further comprising removing excess abrasive particles not entrained by the adhesive before curing.

13. The method according to claim 11, wherein the adhesive is applied onto the inner radius in an amount ranging from 0.008 g/cm$^2$ to 0.024 g/cm$^2$.

14. The method according to claim 11, wherein the abrasive particles are selected from the group consisting of zirconium sand, zirconium silicates, metal oxides, quartz or corundum and mixtures thereof.

15. The method according to claim 11, wherein the abrasive particles have a grain size within the range from about 0.03 mm to about 0.25 mm.

16. The method according to claim 11, wherein curing is by applying UV radiation in the wavelength range from about 180 nm to about 500 nm.

* * * * *